Dec. 13, 1927.
H. C. SEITZ
1,652,738
DIRIGIBLE LAMP FOR VEHICLES
Filed Jan. 21, 1925
2 Sheets-Sheet 1
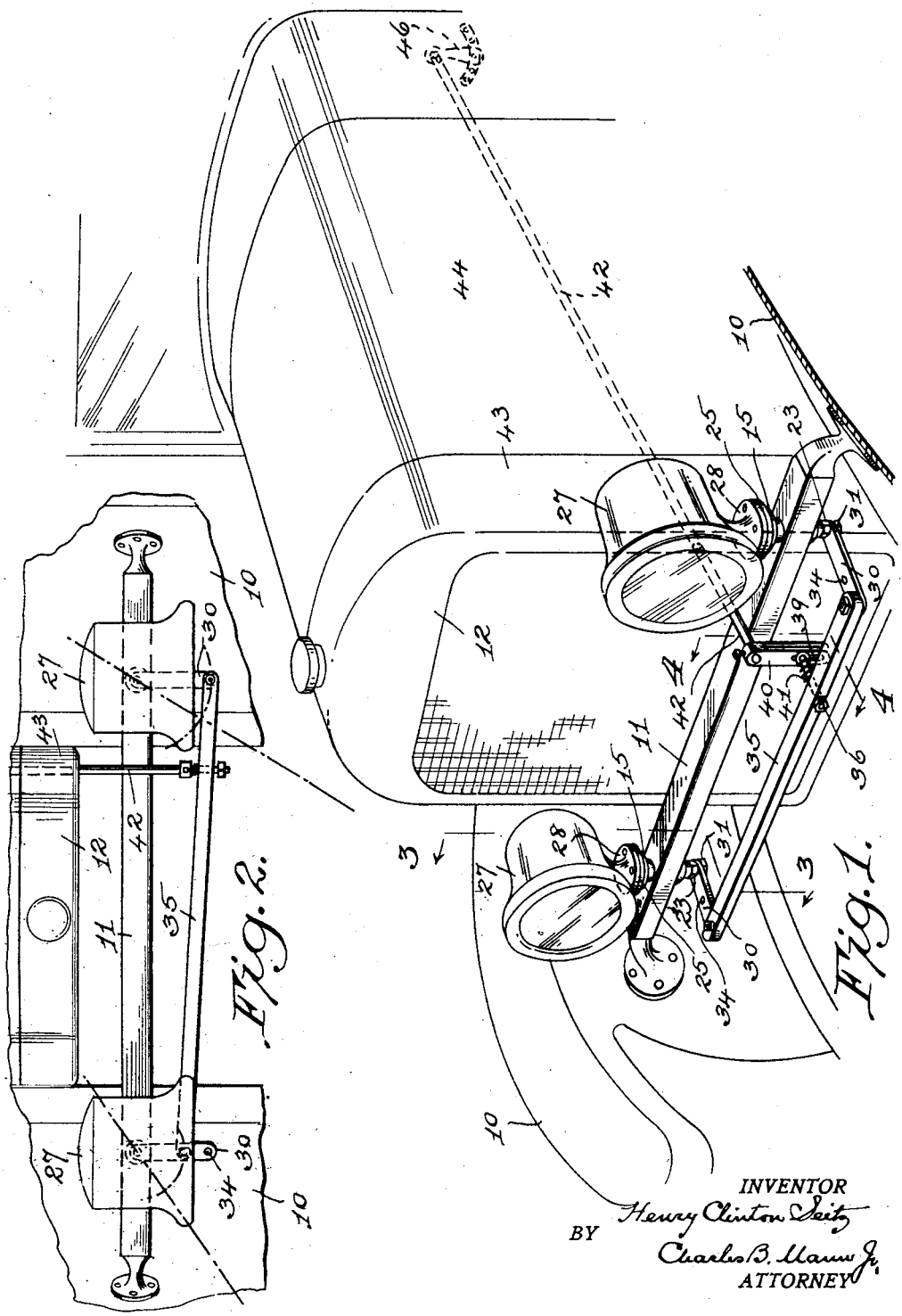
INVENTOR
Henry Clinton Seitz
BY
Charles B. Mann Jr.
ATTORNEY

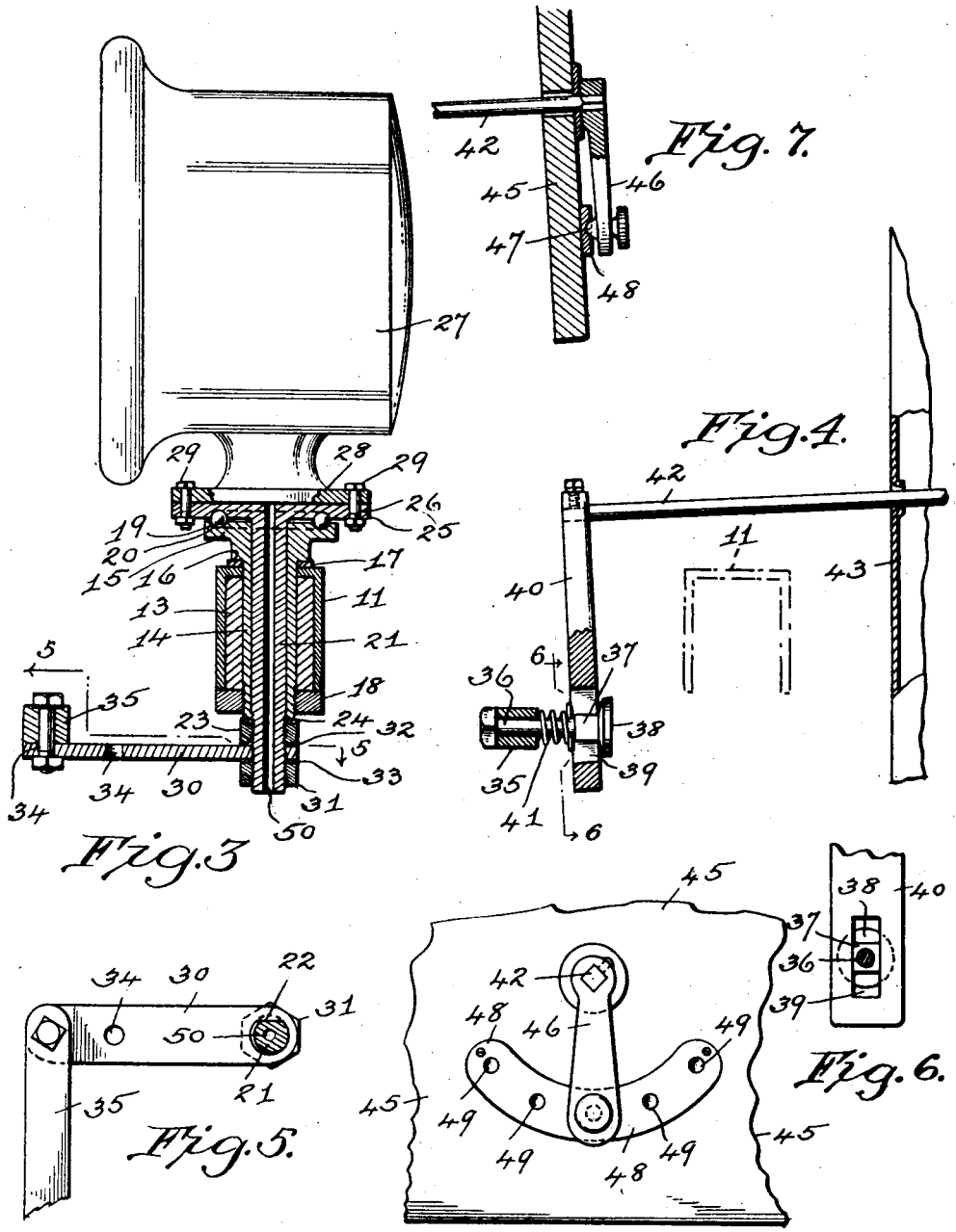

Patented Dec. 13, 1927.

1,652,738

UNITED STATES PATENT OFFICE.

HENRY CLINTON SEITZ, OF NILES, OHIO.

DIRIGIBLE LAMP FOR VEHICLES.

Application filed January 21, 1925. Serial No. 3,785.

This invention relates to improvements in dirigible lamps for vehicles and has for its object to provide improved movable lamp mounts and improved means for actuating the same whereby the light projected by the lamps may be directed to one side or directly forward of the vehicle at the will of the driver.

The invention is illustrated in the accompanying drawings, wherein,—

Fig. 1 shows in perspective, the forward portions of an automobile to which my improved lamp devices are attached.

Fig. 2 illustrates the same in top or plan view.

Fig. 3 shows an enlarged vertical sectional detail through one of the lamp mounts,—the section being taken on the line 3—3 of Fig. 1.

Fig. 4 illustrates an enlarged sectional elevation of the actuating devices as the same would appear if viewed on the line 4—4 of Fig. 1.

Fig. 5 shows the lamp mount and its actuating levers in sectional plan view,— the section being taken on the line 5—5 of Fig. 3.

Fig. 6 illustrates the slotted actuating arm as the same would appear if viewed on the line 6—6 of Fig. 4.

Fig. 7 shows a sectional detail through the instrument board in front of the driver together with the hand lever for operating the lamps, and Fig. 8 illustrates the same devices as viewed from the driver's seat.

Referring to the drawings the numeral 10 designates the front wheel-guards or fenders at the opposite sides of the vehicle, and 11 a brace-bar which connects said fenders and extends horizontally in front of the radiator 12.

This horizontal brace-bar 11 is utilized by me as a support for the lamp-mounts.

As there are two lamp-mounts of like construction, a description of one will apply equally to the other.

By reference to Fig. 3 of the drawing it will be noted that the horizontal brace-bar 11 is of channel formation and that I place a filler of wood or other material 13, in this channel between the opposite vertical flanges.

A tubular sleeve 14, extends vertically through the brace-bar and also through the filler therein and the upper end of this sleeve is provided with an enlarged circular head 15, and with an annular shoulder 16 which latter is located immediately above the brace-bar,—a packing washer 17, being interposed between said shoulder and said bar.

The lower end of the tubular sleeve 14, is externally screw-threaded so that a nut 18, may be screwed thereon and draw the sleeve down and rigidly lock it with respect to the brace-bar.

The enlarged head 15, at the upper end of the sleeve is provided in its upper face with a circular ball-race 19 in which a series of balls 20 are placed for a purpose that will presently be made clear.

A tubular stem 21 extends down vertically through the sleeve 14, and has a screw-threaded lower end which projects below the lower end of said sleeve, as shown in Fig. 3 of the drawing.

The lower projecting threaded end of the stem 21, is flattened on one side as at 22, in Fig. 5 for a purpose that will presently be explained and a nut 23 on the stem holds the latter against vertical play in the sleeve 14 through which it extends.

A packing washer 24 is interposed between the nut 23 and the lower end of sleeve.

The upper end of the tubular stem 21 has a circular head 25 whose under side is provided with an annular channel or race which receives the balls 20 in the head 15 beneath it so that the head 25, and stem 21 may readily be turned with respect to the head 15 and the brace-bar. The head 25 is of a greater diameter than the head 15, so as to overhang the latter and a plurality of bolt-holes 26, extend vertically through said head 25.

The lamp 27, has a base 28 that seats upon the upper side of head 25, and bolts 29 rigidly secure the lamp-base down on said head so that when the head 25 and stem 21 are turned the lamp may also be turned therewith.

On the lower end of the tubular stem 21, there is an arm or lever 30 which latter has an opening through one end with a flat side therein so it will fit or engage the stem-end and be prevented from turning thereon and this arm or lever is held on the stem by means of a nut 31.

Washers 32 and 33 are placed on the stem above and below the lever 30 to prevent rattling.

The arm or lever 30 extends laterally and in a horizontal direction from the tubular stem and the outer end of this lever is provided with a plurality of vertically-extending perforations or holes 34.

A connecting-rod or bar 35, extends from the lever 30 on one stem-end to the lever 30 on the other stem-end whereby the two lamp-mounts may be moved in unison and by pivotally engaging the ends of this bar in one or the other of the perforations 34, one lamp may be swung in a horizontal plane to a greater degree than the other lamp. This is indicated in Fig. 2 of the drawing wherein the bar 35, has one end pivotally engaging one lever 30 through the outermost perforation whereas the other end of said bar is pivotally engaged with the other lever through the second perforation so that when the bar 35 is moved horizontally the lamp at the left will be swung a greater distance than the lamp at the right.

This is especially desirable when vehicles are approaching each other, because by thus shifting the lamps, the light rays may be projected laterally to prevent the light from blinding the approaching driver, and one lamp will direct its rays off to one side of the road to illuminate the extreme side edge of the road and thus enable the driver to see and avoid running off the road or striking objects or persons on that side of the road.

By means of this arrangement it is unnecessary to dim the lights and the driver has the advantage of full light on the road even when passing other vehicles.

In further carrying out my invention I provide means for horizontally moving the connecting-rod or bar 35 from the dash or instrument board as will now be explained.

Through the rod 35 there extends a horizontal bolt 36 whose rear end has a squared portion 37 and a head 38 at the rear of said squared portion, as clearly seen in Figs. 4 and 6 of the drawings.

This bolt 36 passes through a slot 39 in a depending actuating arm 40, and the squared portion 37 thereof has position in said slot while the head 38 seats against the rear side of the arm.

A spring 41, is coiled about the bolt 36 between the rod 35 and the arm 40 and tends to constantly press the rod out toward the outer end of the bolt but will permit said rod to move rearwardly on the bolt by compressing the spring.

This arrangement is provided because when the rod 35, is moved horizontally it must move rearwardly as the levers 30 swing and the spring 41, presses it outwardly on the bolt as the return movement of the rod takes place.

The arm 40 is carried on the forward end of a rod 42 and depends below said rod but the arm is rigidly attached to said rod so as to swing as the rod 42 is rotated.

The rod 42, extends rearwardly through one side of the radiator frame 43, and under and to the rear of the hood 44 and the rear end of this rod passes through the instrument-board 45 and carries a hand-lever 46.

In the present instance this hand-lever has a rounded lug 47 on its under side which confronts a segment-plate 48 that is attached to the instrument-board and this plate is provided with a plurality of depressions 49 into which the lug 48, may seat and thereby hold the lever in any one of a plurality of positions.

Each tubular stem 21, has a central passage 50 therethrough which opens at the upper side of the head 25, so that wiring for supplying current for the lamps may be passed up through said stems.

It is believed to be obvious that by swinging the hand-lever 46 on the instrument-board, rod 42, will be operated and arm 40 on the forward end of that rod will be swung in either a left or right direction and that rod 35, will be moved correspondingly which will swing levers 30 and thus rotate the lamp-mounts and the lamps thereon.

Having described my invention, I claim:—

1. The combination with an automobile having a radiator, of a cross-bar extending horizontally in front of the radiator, two rotatable lamp-supports mounted on said cross-bar, a lamp attached to each support, a lever extending horizontally from each support, a connecting-rod extending horizontally between and pivotally connected to said levers, a rod extending rearwardly from the connecting-rod, a slotted arm on the forward end of said latter rod, a bolt extending through the connecting-bar and having a squared portion in the slot of the arm and a spring on the bolt between the said arm and the connecting-bar.

2. The combination with a vehicle having a radiator and wheel fenders, of a channel-bar extending horizontally between and sustained by the fenders, tubular sleeves near each end of the channel-bar and extending vertically through said bar each sleeve having a flat head above the channel-bar and each flat head having a ball race in its upper side, a stem extending through each tubular sleeve and projecting below the latter,—the upper end of each stem having a flat head with a ball race in its under side and the heads on the stems being of a greater diameter than the heads on the sleeves, a lamp bolted to each stem-head at the outer side of the ball-races, a lever secured to the lower projecting end of each stem below the tubular sleeves, a connecting rod pivotally connected to each lever and a rod extending forward from a point accessible to the driver and means connecting the forward end of the rod with the connecting rod.

In testimony whereof he affixes his signature.

HENRY CLINTON SEITZ.